United States Patent [19]
Pigozzi

[11] Patent Number: 6,066,062
[45] Date of Patent: May 23, 2000

[54] GEAR CHANGE FOR AUTOMOBILE VEHICLE PROVIDED WITH AUXILIARY EPICYCLIC GEAR TRAIN WITH HELICAL GEARS INCLUDING AXIALLY DISPLACEABLE CROWN

[75] Inventor: Gian Maria Pigozzi, Brescia, Italy

[73] Assignee: Iveco Fiat S.p.A., Turin, Italy

[21] Appl. No.: 09/190,580

[22] Filed: Nov. 12, 1998

[30] Foreign Application Priority Data

Nov. 12, 1997 [IT] Italy .................................. TO97A0992

[51] Int. Cl.$^7$ .............................. F16H 3/44; F16H 57/08
[52] U.S. Cl. .................... 475/207; 475/299; 475/302; 475/344; 192/69.7; 192/108
[58] Field of Search ..................... 475/207, 208, 475/298, 299, 343, 344, 269, 302; 192/69.9, 114 T, 108, 53.4, 69.7

[56] References Cited

U.S. PATENT DOCUMENTS

| | | | |
|---|---|---|---|
| 2,331,684 | 10/1943 | Henningsen | 475/299 |
| 4,403,526 | 9/1983 | Numazawa et al. | 475/207 X |
| 4,440,042 | 4/1984 | Holdeman | 475/269 |
| 4,667,538 | 5/1987 | Larsson | 475/299 |
| 4,727,968 | 3/1988 | Chana | 192/144 T X |
| 4,922,767 | 5/1990 | Toshifumi . | |
| 4,976,671 | 12/1990 | Andersson | 475/299 |
| 5,083,993 | 1/1992 | Oun | 475/299 |
| 5,538,119 | 7/1996 | Johnson, Jr. | 192/114 T X |
| 5,626,213 | 5/1997 | Janiszewski | 192/53.4 |

FOREIGN PATENT DOCUMENTS

| | | |
|---|---|---|
| 2103735 | 2/1983 | United Kingdom . |
| 2296053 | 6/1996 | United Kingdom . |

*Primary Examiner*—Charles A. Marmor
*Assistant Examiner*—Ankur Parekh
*Attorney, Agent, or Firm*—Frost & Jacobs LLP

[57] ABSTRACT

A gear change for an automobile vehicle comprising a box, a main train, an input shaft of which is connected to the engine and a primary shaft of which can be connected angularly to the input shaft by a plurality of pairs of gears, and an auxiliary epicyclic gear train comprising, in turn, a sun gear angularly coupled to the primary shaft, a train carrier angularly rigid with an output shaft of the gear change and comprising a plurality of planet gears engaging with the sun gear, and an outer crown having inner teeth engaging with the planet gears, which crown can be displaced along the longitudinal axis between a first operating position in which it is coupled to the box by the engagement of a first and a second toothed wheel and a second operating position in which it is coupled to the train carrier by the engagement of a third and a fourth toothed wheel; the sun gear, the planet gears and the inner teeth of the crown comprising respective helical teeth and the first, second, third and fourth toothed wheels comprising respective teeth having a helical flank in order to generate on the crown, during operation, a restraining reaction having an axial component adapted at least to balance an axial thrust generated on this crown and tending to displace it from the operating position in which it is located.

10 Claims, 5 Drawing Sheets

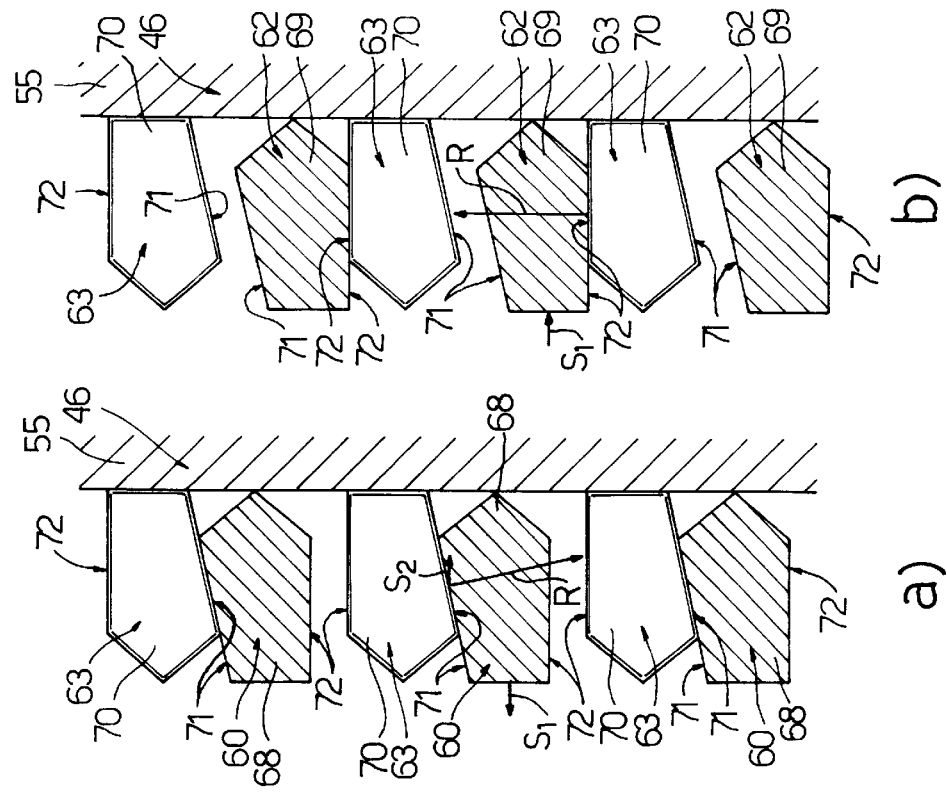
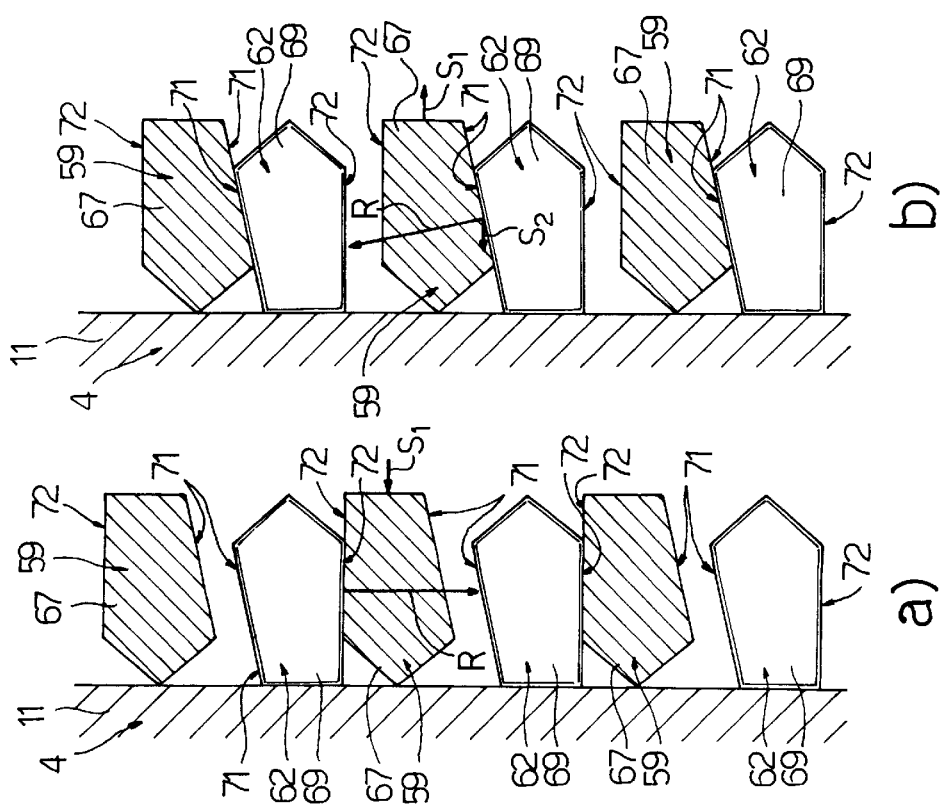

GEAR CHANGE FOR AUTOMOBILE VEHICLE PROVIDED WITH AUXILIARY EPICYCLIC GEAR TRAIN WITH HELICAL GEARS INCLUDING AXIALLY DISPLACEABLE CROWN

BACKGROUND OF THE INVENTION

The present invention relates to a gear change for an automobile vehicle and in particular, but not exclusively, to a gear change for an industrial vehicle.

Gear changes comprising several trains in cascade are known, for instance from Italian Patent 01251251 in the name of the applicants; industrial vehicles are, for instance, generally provided with a gear change comprising a main train defining a certain number of forward ratios and at least one reverse ratio and an output stage with two ratios (direct take-up and reduction) calculated to define, in combination with the main train, two separate series or ranks of ratios.

The output stage is generally formed by an epicyclic gear train with straight teeth, comprising a sun gear rigid with the output shaft of the main train, or primary shaft, a plurality of planet gears borne by a train carrier rigid with an output shaft of the gear change and an outer crown moving in an axial direction between a first operating position in which it is angularly rigid with the gear box (in order to provide a reduction ratio) and a second operating position in which it is angularly rigid with the train carrier (in order to provide for direct take-up). The crown is born, moreover, exclusively by the planet gears, with respect to which it may undergo small displacements in the radial direction allowing for self-centring in the various operating positions and avoiding damaging forcing of the engaged teeth.

These epicyclic gear trains have the drawback that they generate a relatively high level of noise during operation which is propagated via the gear box and the bodywork and can be heard in an irritating manner in the vehicle's passenger space.

In order to remedy this drawback it could be envisaged to increase the sound absorbing capacity of the gear box. Sound absorbing materials could be used for this purpose, although these are generally problematic because of their relatively high specific weight, or the thickness of the sheet metal walls could be increased; these solutions are obviously not compatible with the current trend in the automobile engineering field to reduce the weight of automobile vehicles.

As an alternative, it could be envisaged to provide the gears of the epicyclic gear train with helical teeth which are less noisy than gears with straight teeth. This would, however, raise the problem of supporting the axial forces transmitted, in operation, to the crown which tend to displace it from the operating position in which it is located. This drawback could obviously not be resolved by supporting the crown by collar bearings if it is wished to retain the possibility of self-centring of the crown with respect to the planet gears.

SUMMARY OF THE INVENTION

The object of the present invention is to provide a gear change for an automobile vehicle provided with an epicyclic gear train of an improved type, which makes it possible to remedy the above-mentioned drawbacks connected with known gear changes.

This object is achieved by the present invention which relates to a gear change for an automobile vehicle of the type comprising an external box, a main train, an input shaft of which is adapted to take up the motion from an engine of the automobile vehicle and a primary shaft of which, having a longitudinal axis, can be connected angularly to the input shaft by a plurality of pairs of gears defining different transmission ratios, and an auxiliary epicyclic gear train comprising a sun gear angularly coupled to the primary shaft, a train carrier angularly rigid with an output shaft of the gear change and comprising a plurality of planet gears engaging with the sun gear, and an outer crown having inner teeth engaging with the planet gears, which crown can be displaced along the longitudinal axis between a first operating position in which it is coupled to the box by first coupling means and a second operating position in which it is coupled to the train carrier by second coupling means, the first coupling means comprising a first and second toothed wheel rigid with the crown and the box respectively and adapted to be angularly coupled together in the first operating position of the crown, the second coupling means comprising a third and a fourth toothed wheel rigid with the crown and train carrier respectively and adapted to be angularly coupled together in the second operating position of the crown, characterised in that the sun gear, the planet gears and the inner teeth of the crown comprise respective helical teeth and in that the first, second, third and fourth toothed wheels comprise respective teeth having at least one helical flank inclined with respect to the longitudinal axis in order to generate on the crown, during operation, a restraining reaction having an axial component adapted at least to balance an axial thrust generated on this crown as a result of the engagement of the helical teeth of the auxiliary epicyclic gear train and tending to displace it from the operating position in which it is located.

BRIEF DESCRIPTION OF THE DRAWINGS

The invention is set out in further detail in the following description of a preferred embodiment thereof, given purely by way of non-limiting example, and made with reference to the accompanying drawings, in which:

FIGS. 5a and 5b are plan views of a detail of FIG. 3 in different operating conditions of the automobile vehicle;

FIGS. 6a and 6b are plan views of a detail of FIG. 4 in different operating conditions of the automobile vehicle.

DETAILED DESCRIPTION OF THE INVENTION

Figure 1:
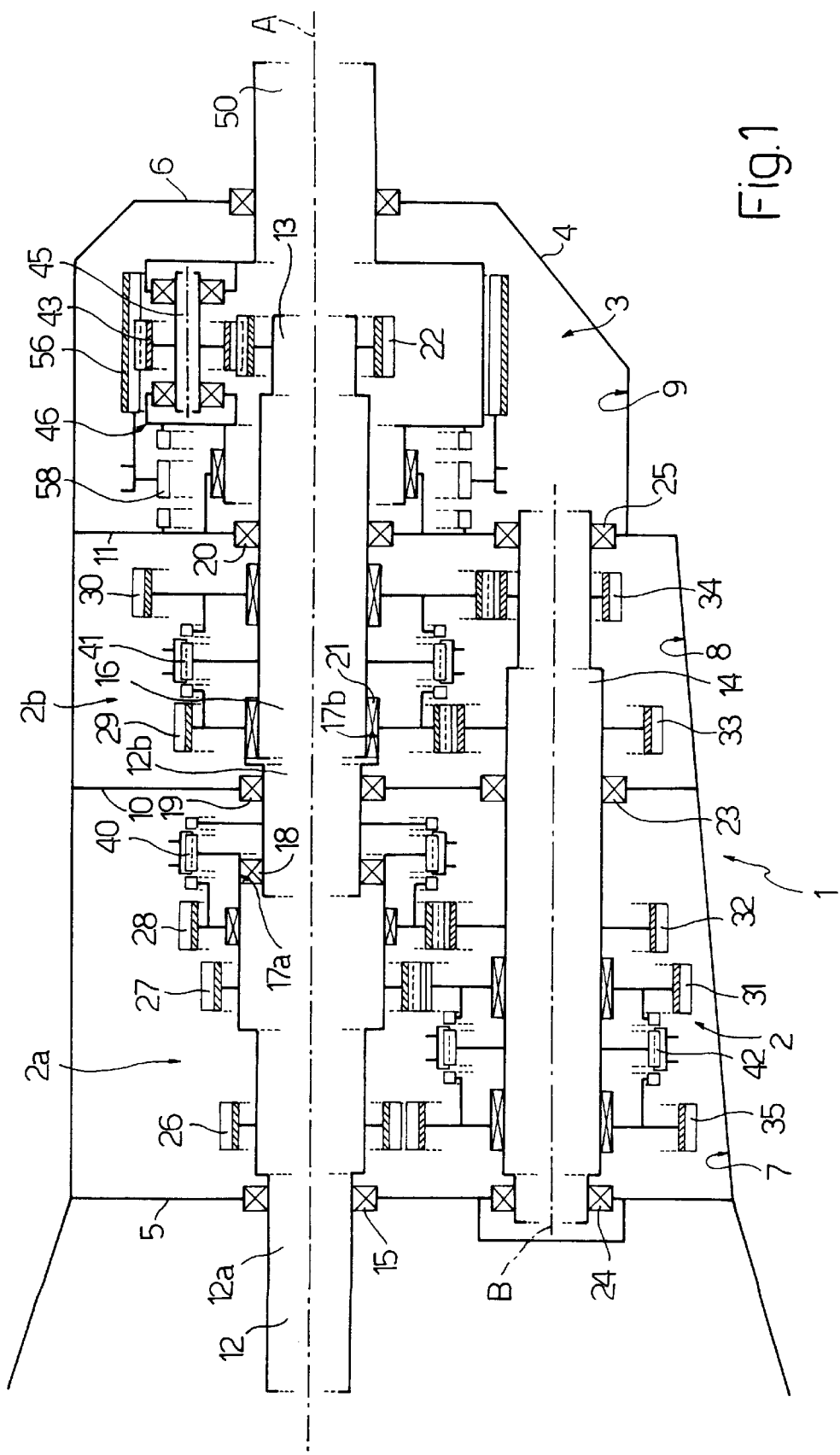
FIG. 1 is an operating diagram of a gear change for an automobile vehicle provided with an epicyclic gear train of improved type of the invention.

In FIG. 1, a gear change for an automobile vehicle, in this case an industrial vehicle (not shown), is shown overall by 1.

The change 1 is essentially formed by a main countershaft train 2 and by an auxiliary epicyclic gear train 3 disposed in cascade and housed in an external box 4. The box 4 is bounded longitudinally by a head wall 5 and by a cover 6 and is divided into three chambers 7, 8 and 9 by a pair of inner walls 10, 11 facing the wall 5 and the cover 6 respectively; the main train 2 is housed in the chambers 7, 8 and the auxiliary train 3 is housed in the chamber 9.

The main train 2 comprises an input shaft 12 having a longitudinal axis A at right angles to the walls 5, 10, 11 and the cover 6 and adapted to receive motion from the automobile vehicle engine (not shown) via a clutch (not shown), a primary shaft 13 coaxial with the input shaft 12 and a countershaft 14 having an axis B parallel to the axis A of the shafts 12 and 13. The countershaft 14 is adapted to receive the engine torque from the input shaft 12 and to transmit it to the primary shaft 13 via a plurality of gears that can be selectively actuated, as will be described below.

The input shaft 12 is formed as two separate parts and comprises a main portion 12a supported radially by a bearing 15 housed in a relative seat provided in the wall 5 of the box 4 and a secondary portion 12b which is supported radially by a bearing 19 housed in a relative seat provided in the wall 10 and has one end engaged in an end seat 17a of the portion 12a with the interposition of a bearing 18 and an opposite end defining a seat 17b engaged by an end portion 16 of the primary shaft 13 with the interposition of a bearing 21.

The primary shaft 13 is, moreover, supported radially by a further bearing 20 housed in a relative seat obtained in the wall 11 of the box 4 and integrally defines, at its end opposite the end portion 16, a pinion 22 forming the sun gear of the auxiliary epicyclic gear train 3.

The countershaft 14 is supported in an intermediate position by a bearing 23 housed in a relative seat provided in the wall 10 and, at its opposite ends, by respective bearings 24, 25 which are housed in relative seats provided in the walls 5 and 11.

The structure of the main train 2 of the gear change 1 is described very briefly, as it does not form the subject matter of the invention.

The train 2 comprises a first wheel 26 rigid with the portion 12a of the input shaft 12, a second wheel 27 also rigid with the portion 12a of the shaft 12 and having a diameter greater than the diameter of the wheel 26, and a third wheel 28 having a diameter greater than the diameters of the wheels 26, 27 and mounted idly on the portion 12a of the shaft 12.

The train 2 further comprises a fourth wheel 29 of a diameter greater than the diameters of the wheels 26, 27 and 28 and rigid with the portion 12b of the shaft 12 and a fifth wheel 30 of a diameter greater than the diameter of the wheel 29 and mounted idly on the shaft 13.

The wheels 26, 27, 28, 29 and 30 are disposed in succession along the axis A from the wall 5 towards the wall 11 of the box 4. The wheels 27, 28, 29 and 30 engage with respective toothed wheels 31, 32, 33 and 34 borne by the countershaft 14; in particular, the wheel 31 is mounted idly on the countershaft 14 while the wheels 32, 33 and 34 are rigid with this countershaft 14.

The wheel 26 is angularly coupled to a wheel 35 mounted idly on the countershaft 14 by respective recall gears (not shown) which reverse the motion for reverse movement.

The wheel 28 may be made selectively rigid with the shaft 12 by a grooved coupling sleeve 40 of conventional type; as an alternative, the sleeve 40 may be displaced axially on the side opposite to the wheel 28 towards the wall 10 in order rigidly to connect the portions 12a and 12b of the shaft 12.

The wheels 29 and 30 may be selectively engaged on the shaft 13 by a coupling sleeve 41 of the same type as the sleeve 40; direct take-up of the vehicle motion takes place when the sleeve 40 is displaced towards the wall 10 and the sleeve 41 simultaneously engages the wheel 29 on the shaft 13.

Similarly to the above, the wheels 31 and 35 may be selectively engaged on the countershaft 14 by a coupling sleeve 42.

The sleeves 40, 41, 42 are displaced to and from relative coupling positions by respective forks (not shown) which are controlled in a known manner by fluid actuators (not shown).

Figure 2:
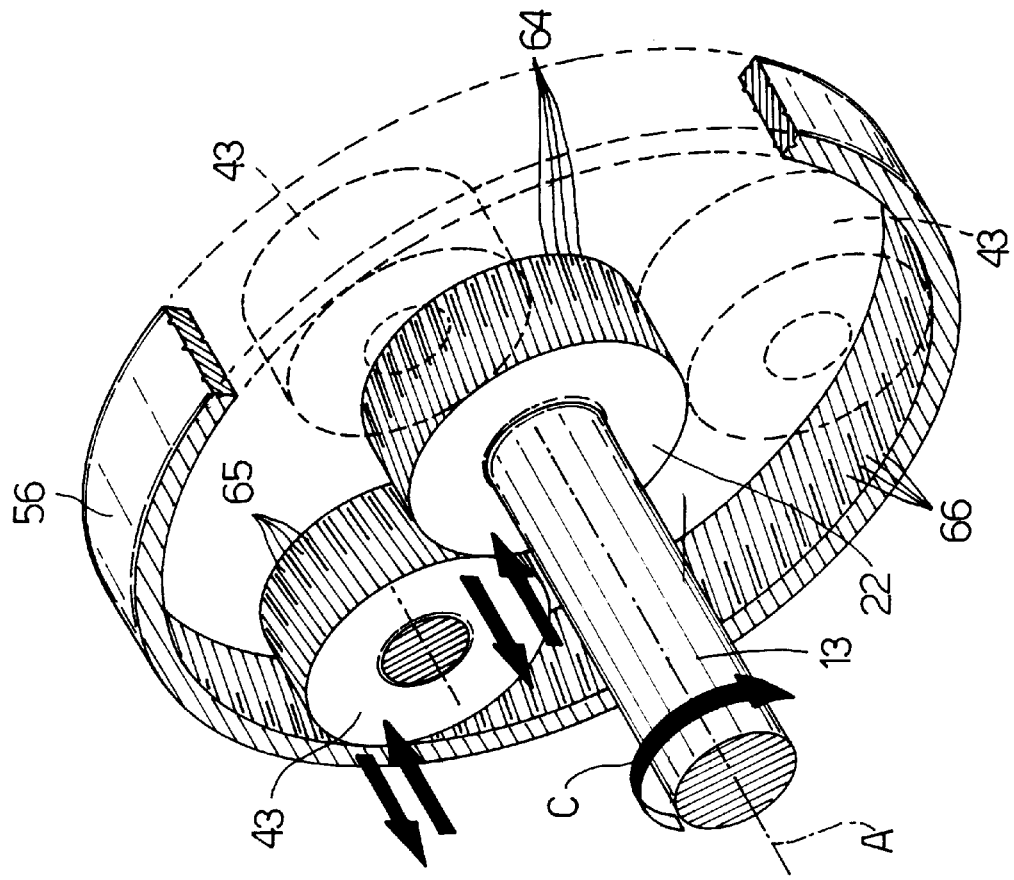
FIG. 2 is a perspective view, on an enlarged scale, of the epicyclic gear train of FIG. 1, with some parts removed for clarity.
Figure 3:
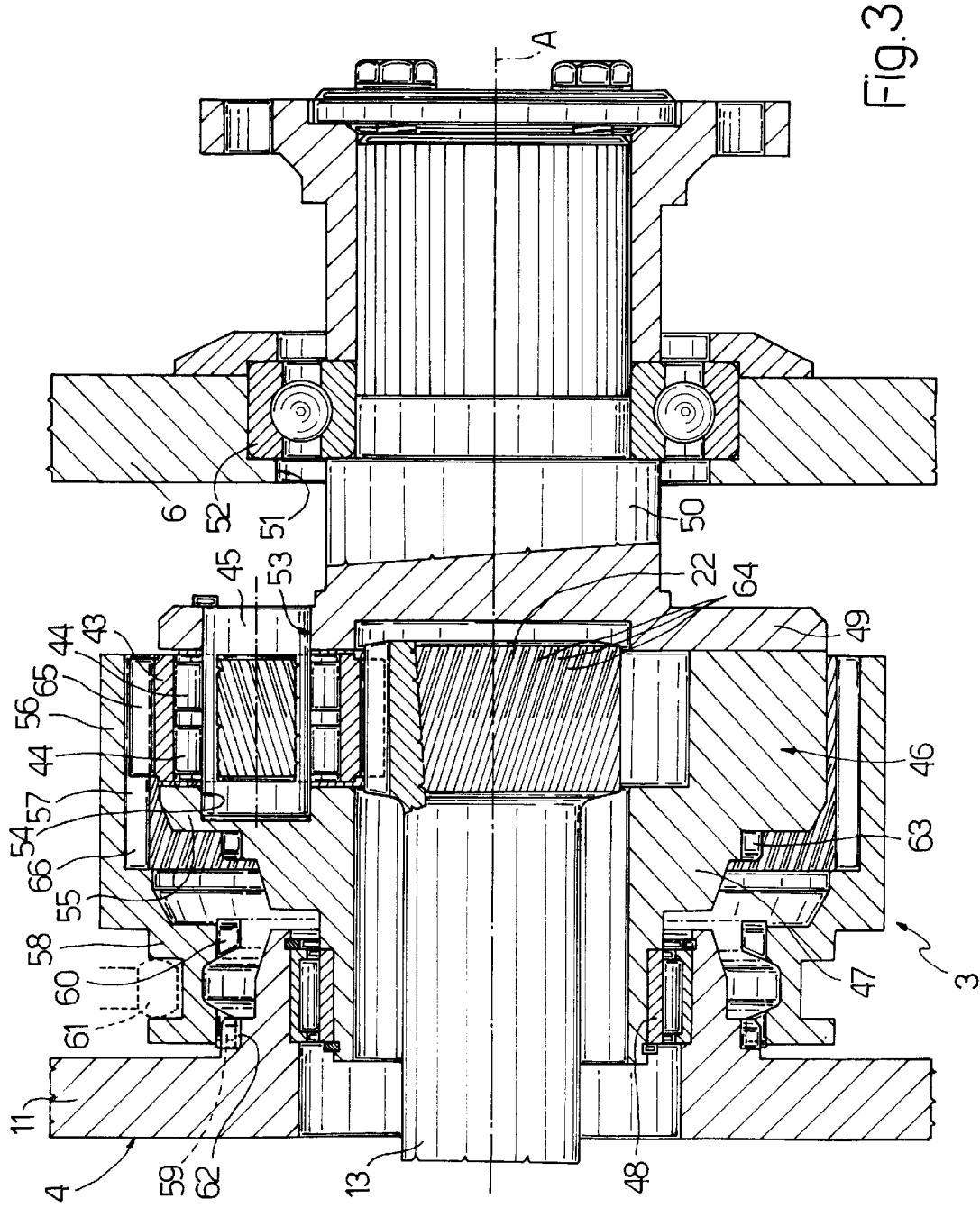
FIG. 3 is an axial section, on an enlarged scale, of the epicyclic gear train of FIGS. 1 and 2, in a first operating position.
Figure 4:
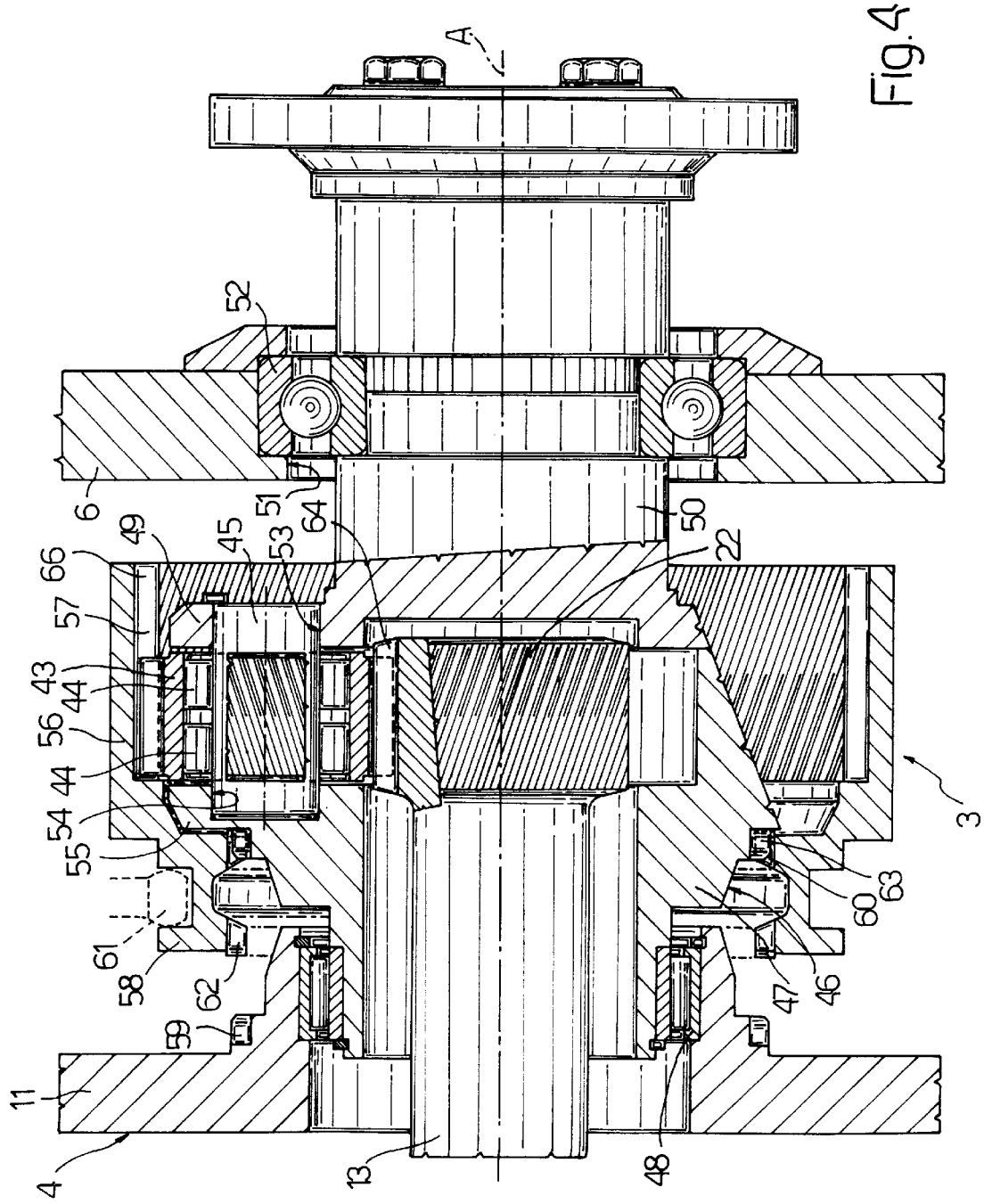
FIG. 4 is an axial section, on an enlarged scale, of the epicyclic gear train of FIGS. 1 and 2, in a second operating position.

With reference to FIGS. 2 to 4, the auxiliary epicyclic gear train 3 comprises a plurality of planet gears 43 which engage with the sun gear 22 and are spaced at equal angular distances around the latter. The planet gears 43 are mounted to rotate by means of roller bearings 44 on respective pins 45 borne by a train carrier 46 supported rigidly, in the radial direction, with respect to the box 4 of the gear change 1. In particular, the train carrier 46 comprises a bell-shaped body 47 supported by a bearing 48 housed in a seat of the wall 11 and by a circular end flange 49 of an output shaft 50 of the gear change 1 mounted to pass through a central hole 51 of the cover 6 of the box 4 and supported radially by a bearing 52 housed in this hole 51. The body 47 and the flange 49 define overall a housing for the planet gears 43. The pins 45 of the planet gears 43 are housed with their opposite ends in a respective seats 53, 54 provided on the flange 49 and on an annular wall 55 of the bell-shaped body 47 facing this flange 49.

The auxiliary train 3 further comprises an outer crown 56 provided with inner teeth 57 which engage with the planet gears 43 and can slide axially thereon. The radial support of the crown 56 is provided exclusively by the planet gears 43 with respect to which it can thus be self-centred.

The crown 56 is further rigidly coupled to a tubular sleeve 58 disposed coaxially outside the body 47 of the train carrier 46 and defining, at its opposite axial ends, respective toothed wheels 59, 60 whose diameters are identical and smaller than the diameter of the teeth 57.

A control member 61, shown diagrammatically in dashed lines in FIGS. 3 and 4 and actuated in turn by an actuator (not shown), engages on the sleeve 58.

The crown 56, via the engagement of the member 61 with the sleeve 58, may be axially displaced in a selective manner between a first operating position (FIG. 3) in which the sleeve 58 is angularly rigid with the box 4 by angular coupling of the toothed wheel 59 with a fixed toothed wheel 62 of axis A borne by the wall 11, and a second operating position (FIG. 4) in which this sleeve 58 is angularly rigid with the train carrier 46 by angular coupling of the toothed wheel 60 with a toothed wheel 63 of axis A borne by the annular wall 55 of the body 47. The coupling of the sleeve 58 is facilitated by known mechanical synchronisers.

According to the present invention, the sun gear 22, the planet gears 43 and the inner teeth 57 of the crown 56 comprise respective helical teeth 64, 65, 66, and the toothed wheels 59, 60, 62, 63 comprise respective teeth 67, 68, 69, 70 (FIGS. 2 to 6) having a helical flank 71 inclined with respect to the axis A so as to generate on the crown 56, in operation, a restraining reaction R having an axial component $S_2$ adapted to oppose and to prevail over an axial thrust $S_1$ generated on the crown 56 as a result of the engagement of the helical teeth 64, 65, 66 of the auxiliary train 3 and tending to displace it from the operating position in which it is located.

With particular reference to FIGS. 5 and 6, the teeth 67, 68, 69, 70 are bounded, on the opposite side of the helical flanks 71, by respective straight flanks 72. More precisely, proceeding tangentially along the outer periphery of each of the toothed wheels 59, 63 in a direction concordant with a direction of rotation C of the primary shaft 13 in forward movement (FIG. 2), the straight flank 72 of the respective teeth 67, 70 is disposed downstream of the relative helical flank 71; vice versa, proceeding tangentially along the outer periphery of each of the toothed wheels 60, 62 in a direction concordant with the direction of rotation C of the primary shaft in forward movement, the straight flank 72 of the respective teeth 68, 69, is disposed upstream of the relative helical flank 71.

As will be explained in detail in the description of operation, in the first operating position of the crown 56, the teeth 67, 69 of the wheels 59 and 62 are coupled together with a predetermined operating play and are adapted to be disposed in contact along the relative straight flanks 72, when the torque transmitted to the crown 56 differs from the direction of rotation C of the primary shaft 13 and generates an axial thrust $S_1$ on the crown 56 directed towards the wall 11 of the box 4 and therefore discharging thereon (operating condition of traction of the automobile vehicle engine, FIG. 5a) and along the relative helical flanks 71 when the torque transmitted to the crown 56 accords with the direction of rotation C of the primary shaft 13 and generates an axial thrust $S_1$ on the crown 56 tending to separate it from the wall 11 (operating condition of release of the automobile vehicle engine or engine brake, FIG. 5b).

Similarly, in the second operating position of the crown 56, the teeth 68, 70 of the wheels 60 and 63 are coupled together with a predetermined operating play and are adapted to be disposed in contact along the relative helical flanks 71, when the torque transmitted to the crown 56 differs from the direction of rotation C of the primary shaft 13 and generates an axial thrust $S_1$ on the crown 56 tending to separate it from the train carrier 46 (operating condition of traction of the automobile vehicle engine, FIG. 6a) and along the relative straight flanks 72 when the torque transmitted to the crown 56 accords with the direction of rotation C of the primary shaft 13 and generates an axial thrust $S_1$ on the crown 56 directed towards the wall 55 of the train carrier 46 and therefore discharging thereon (operating condition of release of the automobile vehicle engine or engine brake, FIG. 6b).

Lastly, the helical flanks 71 of the teeth 67, 68, 69, 70 and the flanks of the helical teeth 66 of the toothing 57 of the crown 56 have approximately the same inclination with respect to the axis A.

The gear change 1 operates as follows.

From an operational point of view, the main train 2 may be formed by a first ratio multiplication stage or "splitter" 2a defining three forward transmission ratios between the input shaft 12 and the countershaft 14 and a "base" stage 2b defining two transmission ratios between the countershaft 14 and the primary shaft 13. The stage 2a further defines a transmission ratio with the direction of rotation reversed which provides, in combination with the two transmission ratios of the "base" stage 2b, two reverse gears.

As regards the "splitter" finction, motion is transmitted from the input shaft 12 to the countershaft 14 by the wheels 27, 31 when the sleeve 42, shown in FIG. 1 in a neutral position, is displaced to the right, or by the wheels 28, 32 when the sleeve 40 is displaced to the left in FIG. 1, or by the wheels 29, 33 when the sleeve 40 is displaced to the right, making the portions 12a and 12b of the shaft 12 angularly rigid.

With reference to the "base" stage 2b, the engine torque is transmitted to the primary shaft 13 in accordance with two different forward transmission ratios, defined by the coupling on the shaft 13 on the wheel 29 (sleeve 41 to the left) or by the wheel 30 (sleeve 41 to the right) giving rise to six forward gears in combination with the three different transmission ratios of the "splitter".

It will be seen that when the sleeve 40 is displaced to the right and the sleeve 41 is displaced to the left, the input and primary shafts 12, 13 are made angularly rigid providing for direct take-up therebetween.

When the sleeve 42 is displaced to the left, the wheel 35 is engaged on the countershaft 9, providing a transmission ratio with the direction of rotation reversed which, as mentioned above, provides two reverse gears in combination with the two different transmission ratios of the "base" stage" 2b (sleeve 41 on the left or right).

As regards, lastly, the auxiliary epicyclic gear train 3, when the crown 56 is disposed in its first operating position (FIG. 3), its operation is that of an epicyclic reducing gear of conventional type, in which the outer crown 56 is fixed and motion is input to the sun gear 22 and output to the train carrier 46.

When, however, the crown 56 is disposed in its second operating position (FIG. 4), the train carrier 46 and the crown 56 are rigid with one another with the result that the rotation of the planet gears 43 about their pins 45 is prevented. The planet gears 43 therefore provide for direct take-up between the sun gear 22 and the train carrier 46 and ultimately between the primary shaft 13 and the output shaft 50.

In the operating condition of traction of the engine, with the gear change 1 in forward gear and with the crown 56 disposed in the first operating position (FIG. 5a), the rotation of the primary shaft 13 in the direction C exerts, as a result of the engagement between the sun gear 22 and the planet gears 43, a thrust action on the crown 56 comprising a tangential component adapted to bring the teeth 67 of the sleeve 58 into contact with the teeth 69 of the fixed toothed wheel 62 along the straight flanks 72, and an axial component $S_1$ directed towards the wall 11 of the box 4 on which it is discharged; in this case the teeth 69 generate a tangential restraining reaction R on the teeth 67 and therefore on the crown 56.

In the operating condition of release of the engine (engine brake), with the gear change 1 in forward gear and with the crown 56 again disposed in the first operating position (FIG. 5b), there is a thrust action on the crown 56 having a direction opposite to the preceding case and comprising a tangential component adapted to bring the teeth 67 of the sleeve 58 into contact with the teeth 69 of the toothed wheel 62 along the helical flanks 71, and an axial component $S_1$ directed towards the wall 6 and therefore tending to displace the crown 56 into its second operating position; in this case, the teeth 69 generate a restraining reaction R, comprising an axial component S2 opposing and prevailing over the axial component $S_1$, on the teeth 67 and therefore on the crown 56. The component $S_2$ prevails over the component $S_1$ for the following reasons: in particular, given the substantial equality between the angles of inclination with respect to the axis A of the helical flanks 71 of the teeth 67 and the flanks of the helical teeth 66 of the teeth 57 and given the fact that the diameter of the toothed wheel 59 of the sleeve 58 is smaller than the diameter of the teeth 57, in order to retain the torque acting on the crown 56 and the sleeve 58 which are rigid with one another, the restraining reaction R transmitted by the toothed wheel 62 to the toothed wheel 59 has a modulus greater than the modulus of the thrust action transmitted to the crown 56 as a result of the movement of the auxiliary epicyclic gear train 3.

In the operating condition of traction of the engine, with the gear change 1 in forward gear and with the crown 56 disposed in the second operating position (FIG. 6a), the rotation of the primary shaft 13 in the direction C exerts, as a result of the engagement between the sun gear 22 and the planet gears 43, a thrust action on the crown 56 comprising a tangential component adapted to bring the teeth 68 of the sleeve 58 into contact with the teeth 70 of the train carrier along the helical flanks 71, and an axial component $S_1$ directed towards the wall 11 and tending therefore to displace the crown 56 into the first operating position. In this case, the teeth 70 generate, on the teeth 68 and therefore on the crown 56, a restraining reaction R comprising, similarly to the case examined with reference to FIG. 5b, an axial component $A_2$ opposite to and prevailing over the axial component $A_1$.

In the operating condition of release of the engine (engine brake), with the gear change 1 in forward gear and with the crown 56 still disposed in the second operating position (FIG. 6b), there is exerted on the crown 56 a thrust action having a direction opposite to the preceding case and comprising a tangential component adapted to bring the teeth 68 of the sleeve 58 into contact with the teeth 70 of the toothed wheel 63 along the straight flanks 72, and an axial component $S_1$ directed towards the wall 55 of the train carrier 46 on which it is discharged; in this case, the teeth 70 generate, on the teeth 68 and therefore on the crown 56, a tangential restraining reaction R.

The advantages offered by the present invention are evident from an examination of the characteristic features of the gear change 1 of the present invention.

In particular, as a result of the use of helical teeth 64, 65, 66, the operating noise of the auxiliary train 3 is substantially reduced with respect to the operating noise of known epicyclic gear trains using straight teeth. At the same time, the main problem connected with the use of helical teeth in epicyclic gear trains with a crown moving in the axial direction, i.e. the problem of supporting the axial forces transmitted, in operation, to this crown, are resolved, as explained in detail in the description, by providing the teeth 67, 68, 69, 70 of the toothed wheels 59, 60, 62, 63 with a helical flank 71. In this way, the radial support of the crown 56 by collar bearings is avoided so that, as in known epicyclic gear trains, the crown 56 can be freely self-centered, in operation, on the planet gears 43.

It should also be noted that the problems discussed with respect to the prior art are resolved by using the same number of components as used for known epicyclic gear trains for the auxiliary train 3.

It is evident that modifications and variations not departing from the scope of protection set out by the claims could be made to the gear change 1.

What is claimed is:

1. A gear change (1) for an automobile vehicle of the type comprising an external box (4), a main train (2), an input shaft (12) of which is adapted to take up motion from an engine of the automobile vehicle and a primary shaft (13) having a longitudinal axis (A), which can be connected to the input shaft (12) by a plurality of pairs of gears defining different transmission ratios, and an auxiliary epicyclic gear train (3) comprising a sun gear (22) angularly coupled to the primary shaft (13), a train carrier (46) angularly rigid with an output shaft (50) of the gear change (1) and comprising a plurality of planet gears (43) engaging with the sun gear (22), and an outer crown (56) having inner teeth (57) engaging with the planet gears (43), which crown (56) can be displaced along the longitudinal axis (A) between a first operating position in which it is coupled to the box (4) by first coupling means (59, 62) and a second operating position in which it is coupled to the train carrier (46) by second coupling means (60, 63), the first coupling means comprising a first and a second toothed wheel (59, 62) rigid with the crown (56) and the box (4) respectively and adapted to be angularly coupled together in the first operating position of the crown (56), the second coupling means comprising a third or a fourth toothed wheel (60, 63) rigid with the crown (56) and the train carrier (46) respectively and adapted to be angularly coupled together in the second operating position of the crown (56), characterized in that the sun gear (22), the planet gears (43) and the inner teeth (57) of the crown (56) comprise respective helical teeth (64, 65, 66) and in that the first, second, third, and fourth toothed wheels (59, 62, 60, 63) comprise respective teeth (67, 69, 68, 70) having at least one helical flank (71) inclined with respect to the longitudinal axis (A) in order to generate on the crown (56), during operation, a restraining reaction (R) having an axial component ($S_2$) adapted at least to balance an axial thrust ($S_1$) generated on this crown (56) as a result of the engagement of the helical teeth (64, 65, 66) of the auxiliary epicyclic gear train (3) and tending to displace it from the operating position in which it is located.

2. A gear change as claimed in claim 1, characterised in that the helical flank (71) of the teeth (67, 69, 68, 70) of each of the first, second, third and fourth toothed wheels (59, 62, 60, 63) and the flanks of the helical teeth (66) of the inner teeth (57) of the crown (56) have approximately the same inclination with respect to the longitudinal axis (A).

3. A gear change as claimed in claim 1, characterised in that the first and third toothed wheels (59, 60) are borne by respective axial ends of a tubular sleeve (58) coaxial with the longitudinal axis (A) and rigid with the crown (56).

4. A gear change as claimed in claim 1, characterised in that the first and third toothed wheels (59, 60) have respective diameters smaller than the diameter of the inner teeth (57) of the crown (56).

5. A gear change as claimed in claim 1, characterised in that the train carrier (46) is formed by two bodies (47, 49) axially facing one another, one of which is angularly rigid with the output shaft (50), the bodies (47, 49) supporting respective ends of pins (45) for the rotation of the planet gears (43) and defining overall a housing for these planet gears (43).

6. A gear change (1) for an automobile vehicle of the type comprising an external box (4), a main train (2), an input shaft (12) of which is adapted to take up motion from an engine of the automobile vehicle and a primary shaft (13) having a longitudinal axis (A), which can be connected to the input shaft (12) by a plurality of pairs of gears defining different transmission ratios, and an auxiliary epicyclic gear train (3) comprising a sun gear (22) angularly coupled to the primary shaft (13), a train carrier (46) angularly rigid with an output shaft (50) of the gear change (1) and comprising a plurality of planet gears (43) engaging with the sun gear (22), and an outer crown (56) having inner teeth (57) engaging with the planet gears (43), which crown (56) can be displaced along the longitudinal axis (A) between a first operating position in which it is coupled to the box (4) by first coupling means (59, 62) and a second operating position in which it is coupled to the train carrier (46) by second coupling means (60, 63), the first coupling means comprising a first and a second toothed wheel (59, 62) rigid with the crown (56) and the box (4) respectively and adapted to be angularly coupled together in the first operating position of the crown (56), the second coupling means comprising a third or a fourth toothed wheel (60, 63) rigid with the crown (56) and the train carrier (46) respectively and adapted to be angularly coupled together in the second operating position of the crown (56), characterized in that the sun gear (22), the planet gears (43) and the inner teeth (57) of the crown (56) comprise respective helical teeth (64, 65, 66) and in that the first, second, third, and fourth toothed wheels (59, 62, 60, 63) comprise respective teeth (67, 69, 68, 70) each having a straight flank (72) opposite to a helical flank (71) inclined with respect to the longitudinal axis (A) in order to generate on the crown (56), during operation, a restraining reaction (R) having an axial component ($S_2$) adapted at least to balance an axial thrust ($S_1$) generated on this crown (56) as a result of the engagement of the helical teeth (64, 65, 66) of the auxiliary epicyclic gear train (3) and tending to displace it from the operating position in which it is located, the teeth (67, 69) of the first and second toothed wheels (59, 62) being adapted to be disposed in contact with one another along the relative straight flanks (72) when the axial thrust ($S_1$) generated on the crown (56) as a result of the engagement of the helical teeth (64, 65, 66) of the auxiliary gear train (3) is directed towards the box (4) and discharges thereon, the teeth (68, 70) of the third and fourth toothed wheels (60, 63) being adapted to be disposed in contact with one another along the relative straight flanks (72) when the axial thrust ($S_1$) generated on the crown (56) as a result of the engagement of the helical teeth (64, 65, 66) of the auxiliary gear train (3) is directed towards the train carrier (46) and discharges thereon.

7. A gear change as claimed in claim 6, characterized in that the helical flank (71) of the teeth (67, 69, 68, 70) of each of the first, second, third and fourth toothed wheels (59, 62, 60, 63) and the flanks of the helical teeth (66) of the inner teeth (57) of the crown (56) have approximately the same inclination with respect to the longitudinal axis (A).

8. A gear change as claimed in claim 6, characterized in that the first and third toothed wheels (59, 60) are borne by respective axial ends of a tubular sleeve (58) coaxial with the longitudinal axis (A) and rigid with the crown (56).

9. A gear change as claimed in claim 6, characterized in that the first and third toothed wheels (59, 60) have respective diameters smaller than the diameter of the inner teeth (57) of the crown (56).

10. A gear change as claimed in claim 6, characterized in that the train carrier (46) is formed by two bodies (47, 49) axially facing one another, one of which is angularly rigid with the output shaft (50), the bodies (47, 49) supporting respective ends of pins (45) for the rotation of the planet gears (43) and defining overall a housing for these planet gears (43).

* * * * *